Oct. 26, 1954
C. R. LEFFLER
2,692,434
DEVICE FOR PLOTTING FLAT BLANKS TO
FORM TUBULAR TRANSITION PIECES
Filed Nov. 14, 1949
2 Sheets-Sheet 1
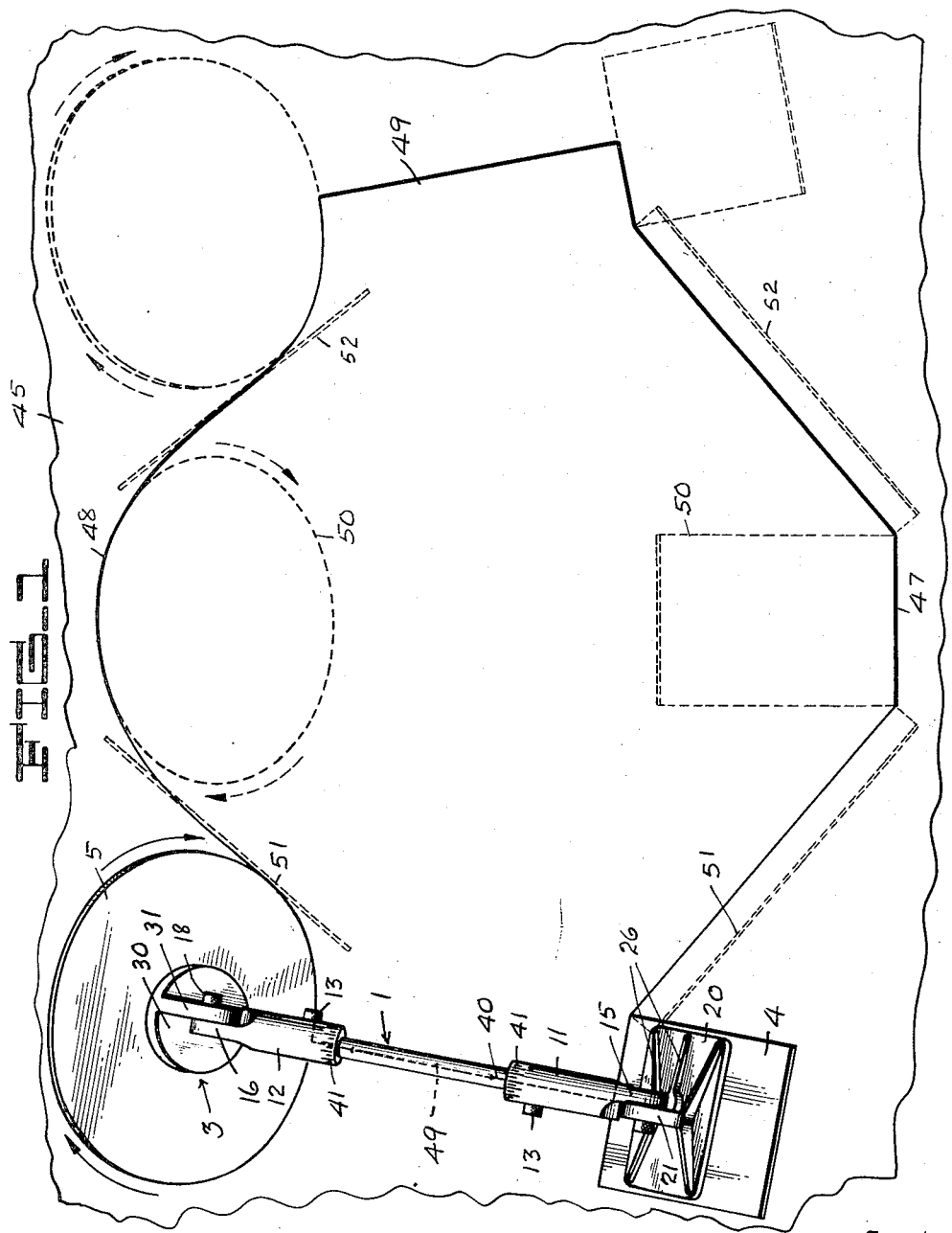
Inventor
CHARLES R. LEFFLER.
By Boyken, Mohler & Beckley
Attorneys

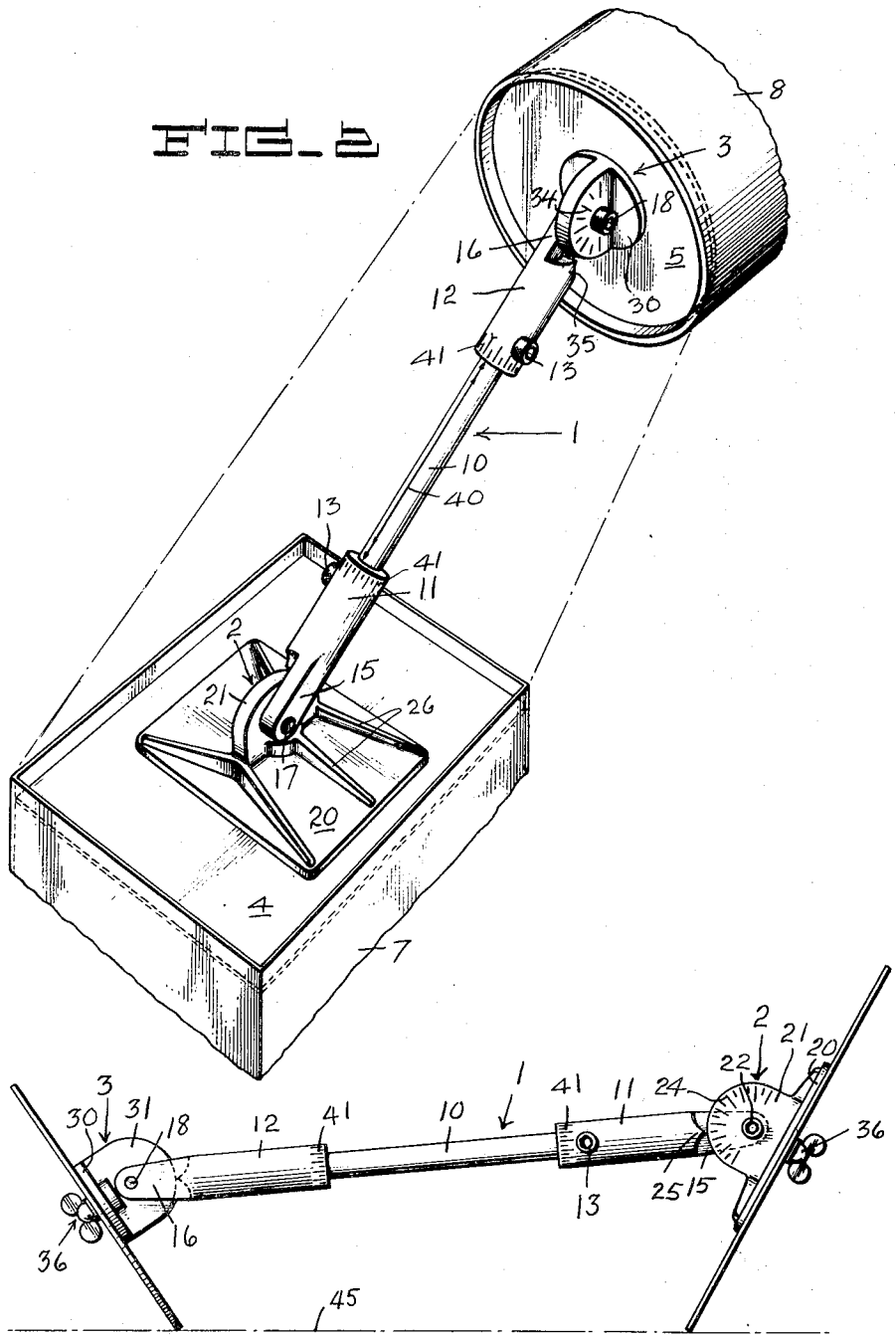

Patented Oct. 26, 1954

2,692,434

UNITED STATES PATENT OFFICE 2,692,434

DEVICE FOR PLOTTING FLAT BLANKS TO FORM TUBULAR TRANSITION PIECES

Charles R. Leffler, Redwood City, Calif., assignor of one-fourth to Wayne R. Millington, Redwood City, Calif.

Application November 14, 1949, Serial No. 126,963

5 Claims. (Cl. 33—26)

This invention relates to a device for plotting on a flat sheet of material the opposite end edges of a transition piece to be subsequently bent to tubular form for providing a connection between a pair of openings.

In sheet metal work, the operation of forming a transition piece for connecting two ducts or conduits of different diameters, or of different shapes and sizes and which openings or ducts may have their central axes offset relative to each other and at different angles, has heretofore been a laborous, time consuming, expensive job, and in many instances, the final result is quite lacking in accuracy. Such transition pieces are first outlined on flat sheet metal and after cutting the piece from the sheet it is bent to tubular form and the adjacent edges are secured together in any suitable manner, such as by crimping or by soldering, welding or riveting.

The main object of the present invention is the provision of a simple, economical, easily operated device that enables a skilled or even an unskilled workman to quickly plot the end edges of any desired transition piece on a flat sheet of material. This device is adapted to accomplish in minutes, and with absolute accuracy, what formerly required hours.

Another object of the invention is the provision of an improved method for plotting the end edge of a transition piece on a flat sheet of material.

In the statement that the present invention is adapted for use in quickly plotting the end edges of any desired transition piece, it is to be understood that this includes transition pieces for openings the axes of which may not be coaxial nor parallel, and the outlines of which may be quite different and of different areas. For example, the axes of the openings that are to be connected by a transition piece may be in different levels and laterally offset and at any angle to each other and one may be poly-sided while the other may be circular or oval. The spacing between the openings may be any reasonable distance where a transition piece is normally employed. The complexity of the problem does not increase the difficulty of laying out the transition piece with the present invention, and with the present invention the outline may be such as will place the seam on any desired side.

Other objects and advantages will appear in the description and in the drawings.

In the drawings, Fig. 1 is a top plan view of a device for use in plotting a transition piece, said device being shown on a sheet of material with the outline of the end edges of such transition piece indicated in full line with the different portions the device will occupy during the plotting of said edges indicated in dash lines.

Fig. 2 is a perspective view of the device of this invention in a position for initially "setting" the same for plotting a particular transition piece adapted to extend between the ends of a rectangular duct and a circular one, portions of the ends of said ducts being shown.

Fig. 3 is a side elevation view of the device of Fig. 2 in position for plotting on flat sheet.

In detail, the device illustrated in the drawings comprises a central elongated member, generally designated 1, that has a pair of elements 2, 3 at its opposite ends to which templates 4, 5 are secured.

The templates 4, 5 are flat pieces of sheet material, such as metal, although they may be of any reasonably rigid material. In the present instance the outline of template 4 corresponds to the rectangular outline of the opening at the end of a duct or conduit 7, such, for example, as may be at the inlet end of the air duct for a house heating or air conditioning system. The outline of template 5 corresponds to the circular outline of the opening at the end of a cylindrical duct or conduit 8, such as may be at the furnace or air circulating means in a building. As usually occurs, the conduits 7, 8 are not in alignment, although if they were, the present invention would be equally applicable. The end edges of ducts 7, 8 may or may not be in planes normal to the central axes of the ducts 7, 8, assuming said ducts have straight end portions. The end edges may be in planes that are at angles less than 90° relative to the end portions of the ducts. In any event, the outlines of the templates normally follow the outlines of the edges defining the openings, hence template 5 would not be truly circular if the end edges of the duct 8 defining the open end were cut off at an angle relative to the central axis of the end portion of the duct 8.

The central member 1 is preferably made up of a central cylindrical section 10, an end section 11 adjacent the template 4 and an end section 12 adjacent the template 5. These end sections 11, 12 are tubular for telescopically receiving therein the end portions 11, 12 adjacent their adjacent ends for rigidly, but releasably, securing said end sections 11, 12 to the ends of the central section 10 against relative rotation between said end sections and the central section, and against longitudinal movement of said end sections relative to said central section unless and until it is desirable to rotate said end sections and to move one or both of said sections to a new position in longitudinal extension of said central section.

The opposite outer end portions 15, 16 of said sections 11, 12 respectively, are preferably flattened longitudinally of said end sections, and said end portions are respectively apertured perpendicular to the central longitudinal axis of each end portion for threadedly engaging screws 17, 18.

The elements, generally designated 2, 3 are for holding the templates 4, 5. The element 2 may comprise a rectangular plate 20 having a central substantially semicircular lug 21 formed on its rear side and projecting perpendicularly from said plate. This lug has flat sides and is formed with an opening at the center of its radius adapted to pass screw 17, that, as has been explained, is adapted to threadedly enter the central opening in the flattened end portion 15 of section 11. The head 22 of said screw is adapted to engage said lug for tightening the latter against the said end portion 15.

Around the semicircular periphery of lug 21 are radially extending protractor graduations 24 having the opening in said lug as the center. Adjacent the periphery of said lug the section 11 is formed with an indicator 25. Thus, when the plate 20 is perpendicular to the section 11, the indicator will point to 90°, and if the plate is rotated in one direction or the other about screw 17 as the pivotal point, the reading will indicate the exact angle between the axis of section 11 and the plane of plate 20.

Reinforcing ribs 26 are preferably cast on the rear side of plate 20 to insure against injury to the plate that might cause variations in the plate itself relative to the pivot.

The element 3 may comprise a circular plate 30 having a semicircular lug 31 formed on its rear side, said lug 31 being identical with lug 21 and being for the same purpose.

Lug 31 is apertured at the center of the radius of the semicircular edge of said lug for passing screw 18. Said screw 18 has a head 22 that is adapted to clamp the lug to the flat end portion 16 of section 12. This lug 31 is marked with protractor graduations 34, and the section 12 is formed with an indicator 35 corresponding with indicator 25 on lug 2.

The outer surfaces of the plates 20, 30 are perfectly flat and each is centrally provided with a central threaded opening for threadedly receiving a screw having a clamping head 36 thereon, each of which may have wings for finger operation.

Each template has a central opening for each of the clamping screws. Thus the head 37 of each screw will releasably clasp the templates 4, 5 against the plates 20, 30. To change templates, the screws are merely removed to release the old templates, and a new one is then clamped in place.

It is to be understood that the plates 20, 30 may be of any desired outline. They need not be circular or square, since their function is to provide a support against which the template is clamped, the support and head of the clamping screw providing the clamping elements. The periphery of the template secured thereto will always extend beyond the edges of the plates 20, 30 unless the plates themselves are used as templates, which would be possible if they had the correct outlines and, in some instances this may be the case, since said plates could be changed by removing the screws 17, 18.

Usually templates would be used for the reason that in any shop where only several standard transition pieces are made, the likelihood is that templates of such pieces would be used instead of attempting to plot out each piece.

Preferably the central section 10 has a longitudinally extending line 40 inscribed thereon, or aligned lines may be used only at the ends of the central section if desired, leaving the center unmarked. This line 40 provides points at the junctures between end sections 11, 12 and said central portion, the ends of said sections at said juncture being formed with equally spaced graduation marks 41 in a row extending around the outer ends of said sections. These may be given values that will enable the user to determine the angular variation between a plane extending through said central mark 40 (and parallel therewith) and through the central axis of the central member 10, and planes respectively perpendicular to the axes of pivots 17, 18 and which latter planes also extend through the central axis of section 40 and parallel therewith. Screws 13 releasably secure the end sections against rotation relative to the central section.

In operation, assuming the user wishes to lay out or to plot the end edges of a transition piece that will accurately fit the adjacent open ends of the ducts 7, 8, the first step will be to cut templates 4, 5 that will substantially correspond with the outlines of the adjacent edges of said ducts, which does not require any great degree of skill and which may be quickly done. Each template is then centrally apertured and the templates are then secured against plates 20, 30.

The next step is to place the template 5 within the open end of duct 8 in a plane substantially perpendicular to the plane in which the end edges of said duct are disposed, and the template 4 is similarly placed within the end of duct 7. Screws 17, 18 enable the templates to be angularly adjusted so that they are in planes parallel with the plane in which the edges of the end openings of said ducts are disposed, and screws 17, 18 enable the central member to be extended so that the templates will reach said openings, and said latter screws also permit adjustment of the templates should the axes of ducts 7, 8 not be in the same plane. If the distance between the end openings in the ducts is too great for the central member 1, it is merely necessary to replace the central section 10 with one of suitable length.

After the templates are correctly positioned, and the screws 13, 17, 18 are tightened, the device may be placed on the sheet 45 of metal from which the transition piece is to be cut.

Any sheet having a transfer surface, such as graphite, carbon, whiting, etc. may be placed between the templates and the sheet of metal to be cut.

Upon rolling the device having the templates in the direction of the arrows (Fig. 1) the templates will cause the lines 47, 48 to be formed on the metal, which lines will accurately define the end edges of the tubular transition piece when the latter is bent to join the ends 49. These end edges will precisely follow the contours of the open ends of the conduits 7, 8. If it is desired that the ends of the transition piece extend into the conduits or over the ends of the conduits; it is obvious that the seam to be formed along the edges 48, 49 may be slightly varied and the end edges may be formed on outside lines 47, 48 but parallel therewith when cutting the metal.

If desired, the edges of the templates may be chalked or treated to carry the marking material for marking lines 47, 48, in which case the transfer paper could be omitted. Or it is relatively simple for an operator to merely mark the sheet material with a crayon or pencil at the point of contact between the templates and the plate or sheet as the templates are rolled over the sheet. This latter procedure requires care to prevent any slippage of the templates on the sheet since it is usually rolled over the sheet twice in order to mark the path of both templates.

The successive positions of the templates during their movement over the sheet are indicated in dash lines in Fig. 1, and it will be seen that the edges 49 are so positioned as to bring the seam on the inside bend of the transition piece when the blank is bent. If it is desired that the seam be on the outside, it is only necessary that the templates be initially positioned on the sheet in the dash line positions 50, and then one complete revolution of the templates be effected on the sheet. If a side seam is desired, the templates should be started in positions 51 or 52 according to the side. The marking commences directly below the central member 1 in each instance and terminates centrally below said member, as seen in Fig. 1 irrespective of which side of the transition piece is to have the seam.

From the foregoing explanation, it is seen that the outlines and sizes of the openings to be connected by the transition piece are immaterial. The device works in the same manner irrespective of the variations. Nor does the angular relationship between the planes of the edges of said openings make any difference nor the degree or direction of offset between the central axes of the said openings. The simple mechanics of either positioning the templates in the openings or at their edges, as described, and then locking them rigid and marking their paths of travel on the sheet, is all that is required to plot with precise accuracy the end edges of the transition piece.

In those instances where it is desired that the transition pieces be formed in advance of the installation of the ducts or the formation of openings to be connected, the provision of the protractor markings 24 and the graduation 40, 41 enable the user to follow the specifications and to thus plot the transition pieces without requiring the ducts or the openings as guides.

It is to be understood that the precise structure above described in detail is not intended to be restrictive of the invention, but is merely a preferred form. It is obvious that the means for securing the templates to the ends of the central member 1 may be varied and that the elements 5, 20 need not be exactly the shapes disclosed. Also the central member could be made up of more telescopically connected members than illustrated to provide for greater extension or shortening. However, such structure ordinarily would increase the cost without any material benefit, and would introduce complexities that would be likely to give trouble or be easily injured. It is a simple matter for the average shop to carry sufficient different length rigid central elements 10 to take care of any substantial differences in length and the variation provided for by the telescopic connections between end sections 11, 12 and said central section is adequate for a wide range of lengths.

I claim:

1. A device for plotting on a flat sheet of material the opposite end edges of a transition piece to be subsequently bent to tubular form for fitting said end edges in spaced openings to be connected by said transition piece, said device comprising a pair of template clamping elements respectively adapted to engage the opposite sides of a template for securing thereto templates respectively formed with outer peripheral edges substantially corresponding in outline and area with the outlines and areas of said openings, an elongated member, means for pivotally securing said elements to the ends of said member for swinging to different angular positions relative to the longitudinal axis of said member, said member and said element having relatively movable adjoining portions, one of said portions including protractor graduations marked thereon and the other adjoining portion including a fixed graduation for indicating in degrees the angularity between the central axis of said member and said clamping elements.

2. A device for plotting on a flat sheet of material the opposite end edges of a transition piece to be subsequently bent to tubular form for fitting said end edges in spaced openings to be connected by said transition piece, said device comprising a pair of template clamping elements respectively adapted to engage the opposite sides of a template for securing thereto templates respectively formed with outer peripheral edges substantially corresponding in outline and area with the outlines and areas of said openings, an elongated member, means for pivotally securing said elements to the ends of said member for swinging to different angular positions relative to the longitudinal axis of said member, said member and said element having relatively movably adjoining portions, one of said portions including protractor graduations marked thereon and the other adjoining portion including a fixed graduation for indicating in degrees the angularity between the central axis of said member and said clamping elements, said elongated member having a central section and opposite end sections, said end sections being rotatable about the longitudinal axis of said central section and graduations on the said central section and said end sections at their junctures for indicating the degree of rotation of said end sections relative to said central section.

3. A device for plotting outlines of a flat blank for formation of a transition piece adapted to extend between a pair of spaced openings comprising: a central, elongated spacing member, a pair of end members telescopically carried by the opposite ends respectively of said central member for adjustable axial movement relative thereto, means for releasably securing said central member and end members together for movement as a unit, first clamping members swingably secured respectively to the ends of said end members that are remote from said central member, and second clamping members releasably secured to said first clamping members and adapted to clamp planar, rigid templates between said first and second clamping members.

4. A device for plotting outlines of a flat blank for formation of a transition piece adapted to extend between a pair of spaced openings comprising: a central, elongated spacing member, a pair of end members telescopically carried by the opposite ends respectively of said central member for adjustable axial movement relative thereto, means for releasably securing said central member and end members together for movement as a unit, first clamping members swingably secured respectively to the ends of said end members that are remote from said central member, and second clamping members releasably secured to said first clamping members and adapted to clamp planar, rigid templates between said first and second clamping members, said first clamping members being provided with calibrations to indicate the degree of angularity between the same and the longitudinal axis of said central member.

5. A device for plotting outlines of a flat blank for formation of a transition piece adapted to extend between a pair of spaced openings comprising: a central, elongated spacing member, a pair of end members telescopically carried by the opposite ends respectively of said central member for adjustable axial movement relative thereto, means for releasably securing said central member and end members together for movement as a unit, first clamping members swingably secured respectively to the ends of said end members that are remote from said central member, and second clamping members releasably secured to said first clamping members and adapted to clamp planar, rigid templates between said first and second clamping members, said clamping members including screwthreaded elements for so releasably securing said second clamping members to said first clamping members.

References Cited in the file of this patent

UNITED STATES PATENTS

| Number | Name | Date |
|---|---|---|
| 809,432 | Darrschmidt | Jan. 9, 1906 |
| 984,347 | Cardell | Feb. 14, 1911 |
| 1,015,423 | Cardell | Jan. 23, 1912 |
| 1,482,186 | Fales | Jan. 29, 1924 |
| 2,431,100 | Woods | Nov. 18, 1947 |
| 2,541,808 | Cahill et al. | Feb. 13, 1951 |
| 2,585,135 | Klakovich | Feb. 12, 1952 |
| 2,624,944 | Pujda | Jan. 13, 1953 |

FOREIGN PATENTS

| Number | Country | Date |
|---|---|---|
| 128,677 | Germany | Mar. 3, 1902 |
| 27,794 | Great Britain | 1911 |
| 347,410 | Germany | Jan. 18, 1922 |
| 560,355 | Great Britain | Mar. 31, 1944 |